United States Patent
Singh et al.

(10) Patent No.: US 9,200,800 B2
(45) Date of Patent: Dec. 1, 2015

(54) METHOD AND SYSTEM FOR STEAM GENERATION AND PURIFICATION

(71) Applicant: General Electric Company, Schenectady, NY (US)

(72) Inventors: Surinder Prabhjot Singh, Schenectady, NY (US); Dhaval Ajit Bhandari, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 29 days.

(21) Appl. No.: 14/157,885

(22) Filed: Jan. 17, 2014

(65) Prior Publication Data

US 2015/0204536 A1    Jul. 23, 2015

(51) Int. Cl.
  *B01D 53/22* (2006.01)
  *B01D 69/08* (2006.01)
  *F22B 1/18* (2006.01)
  *F22B 9/10* (2006.01)
  *F28B 9/10* (2006.01)

(52) U.S. Cl.
  CPC ............. *F22B 1/1853* (2013.01); *B01D 53/22* (2013.01); *B01D 69/08* (2013.01); *F28B 9/10* (2013.01); *B01D 2053/224* (2013.01)

(58) Field of Classification Search
  CPC .. B01D 53/22; B01D 69/08; B01D 2053/224; B01D 2256/00; B01D 2257/504; F22B 1/1853; F22B 9/10; E21B 43/2406
  USPC .................................................. 95/8, 52; 96/4
  See application file for complete search history.

(56) References Cited

U.S. PATENT DOCUMENTS

| 4,725,359 | A  | * | 2/1988 | Ray ................................ 210/640 |
| 4,879,041 | A  | * | 11/1989 | Kurokawa et al. ................. 95/46 |
| 5,562,754 | A  |   | 10/1996 | Kang et al. |
| 6,395,067 | B1 |   | 5/2002 | Kuznicki et al. |
| 7,459,084 | B2 |   | 12/2008 | Baig et al. |
| 7,814,867 | B2 | * | 10/2010 | Betzer Tsilevich ............. 122/11 |
| 8,419,838 | B2 |   | 4/2013 | Itami |
| 8,468,980 | B2 |   | 6/2013 | Betzer |
| 2007/0072949 | A1 |   | 3/2007 | Ruud et al. |
| 2009/0145847 | A1 | * | 6/2009 | Spiegelman et al. ......... 210/662 |
| 2010/0037835 | A1 |   | 2/2010 | Betzer Tsilevich |

(Continued)

FOREIGN PATENT DOCUMENTS

| CA | 2665751 | A1 | 11/2009 |
| EP | 2154237 | A2 | 2/2010 |

(Continued)

*Primary Examiner* — Jason M Greene
(74) *Attorney, Agent, or Firm* — Francis T. Coppa

(57) ABSTRACT

A method and system for steam generation and purification is presented. The method includes receiving a fuel stream, a water stream, and an oxidant stream in a direct contact steam generation (DCSG) apparatus; and generating a gas mixture stream comprising steam and carbon dioxide ($CO_2$) in the DCSG apparatus. The method further includes receiving at least a portion of the gas mixture stream in a membrane separator, and separating at least a portion of the steam from the gas mixture stream to generate a permeate stream. The method further includes recirculating at least a portion of the permeate stream to the DCSG apparatus; monitoring a $CO_2$ content in the gas mixture stream; and discharging at least a portion of the gas mixture stream at an outlet of the DCSG apparatus as a product stream if the $CO_2$ content is lower than a determined value.

20 Claims, 3 Drawing Sheets

(56) References Cited

U.S. PATENT DOCUMENTS

| | | |
|---|---|---|
| 2010/0050517 A1 | 3/2010 | Tsilevich |
| 2011/0020188 A1 | 1/2011 | Muthuramalingam et al. |
| 2011/0030384 A1 | 2/2011 | Ku et al. |
| 2011/0036308 A1 | 2/2011 | Betzer-Zilevitch |
| 2011/0099969 A1 | 5/2011 | Ku et al. |
| 2011/0232545 A1 | 9/2011 | Clements |
| 2012/0160187 A1* | 6/2012 | Bunio et al. ............ 122/31.1 |
| 2012/0272657 A1* | 11/2012 | Baker et al. .............. 60/772 |
| 2013/0015052 A1 | 1/2013 | Vane et al. |
| 2013/0022510 A1 | 1/2013 | Keshavan et al. |
| 2013/0047855 A1 | 2/2013 | Polishchuk |
| 2014/0224192 A1* | 8/2014 | Bool et al. ............ 122/31.1 |

FOREIGN PATENT DOCUMENTS

| | | |
|---|---|---|
| WO | 2012086836 A1 | 6/2012 |
| WO | 2012123571 A1 | 9/2012 |

\* cited by examiner

METHOD AND SYSTEM FOR STEAM GENERATION AND PURIFICATION

BACKGROUND OF THE INVENTION

The invention relates generally to a method and system for steam generation and purification. More particularly, the invention relates to a method and system for steam generation and purification using a direct contact steam generation (DCSG) apparatus.

Many industrial processes, such as, for example, power generation and chemical processes typically require high temperature and high purity steam. As compared to conventional indirect steam generation, direct contact steam generators (DCSG) have the advantage of being smaller and easily transportable, of having high energy efficiency, the ability to use somewhat lower quality water, and of requiring significantly less capital expense. However, steam produced using DCSG technology is often contaminated with gaseous impurities (such as carbon dioxide and nitrogen), which may be undesirable and require additional separation steps. Conventional separation methods may however reduce temperature and/or pressure of the steam generated. In such systems, additional high temperature compressors may be needed to increase the steam pressure for end-use applications, such as, enhanced oil recovery (EOR) or steam-assisted gravity drainage (SAGD).

Thus there is a need for improved methods and systems for steam generation and purification using a direct contact steam generation (DCSG) apparatus.

BRIEF DESCRIPTION OF THE INVENTION

One embodiment is directed to a method for steam generation and purification. The method comprises:

(i) receiving a fuel stream, a water stream, and an oxidant stream in a direct contact steam generation (DCSG) apparatus;

(ii) generating a gas mixture stream comprising steam and carbon dioxide ($CO_2$) in the DCSG apparatus;

(iii) receiving at least a portion of the gas mixture stream in a membrane separator, and separating at least a portion of the steam from the gas mixture stream to generate a permeate stream;

(iv) recirculating at least a portion of the permeate stream to the DCSG apparatus;

(v) monitoring a $CO_2$ content in the gas mixture stream; and (vi) discharging at least a portion of the gas mixture stream at an outlet of the DCSG apparatus as a product stream if the $CO_2$ content is lower than a determined value.

Another embodiment of the invention is directed to a method for steam generation and purification. The method comprises:

(i) receiving a methane stream, a water stream, and an oxidant stream in a direct contact steam generation (DCSG) apparatus;

(ii) generating a gas mixture stream comprising steam and carbon dioxide ($CO_2$) in the DCSG apparatus;

(iii) receiving at least a portion of the gas mixture stream and a methane sweep gas in a membrane separator, and separating at least a portion of the steam from the gas mixture stream to generate a permeate stream comprising steam and at least a portion of the methane sweep gas;

(iv) recirculating at least a portion of the permeate stream to the DCSG apparatus;

(v) monitoring a $CO_2$ content in the gas mixture stream; and (vi) discharging at least a portion of the gas mixture stream at an outlet of the DCSG apparatus as a product stream if the $CO_2$ content is lower than a determined value.

Another embodiment of the invention is directed to a system for steam generation and purification. The system comprises:

(i) a direct contact steam generator (DCSG) apparatus configured to receive a fuel stream, a water stream, and an oxidant stream, and further configured to generate a gas mixture stream comprising steam and carbon dioxide ($CO_2$);

(ii) a membrane separator configured to receive at least a portion of the gas mixture stream, and separate at least a portion of the steam from the gas mixture stream to generate a permeate stream;

(iii) a recirculation loop configured to supply at least a portion of the permeate stream to the DCSG apparatus;

(iv) a monitoring unit configured to monitor a $CO_2$ content in the gas mixture stream; and (v) a discharge outlet in the DCSG apparatus configured to discharge at least a portion of the gas mixture stream as a product stream if the $CO_2$ content is lower than a determined value.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill, having the benefit of this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
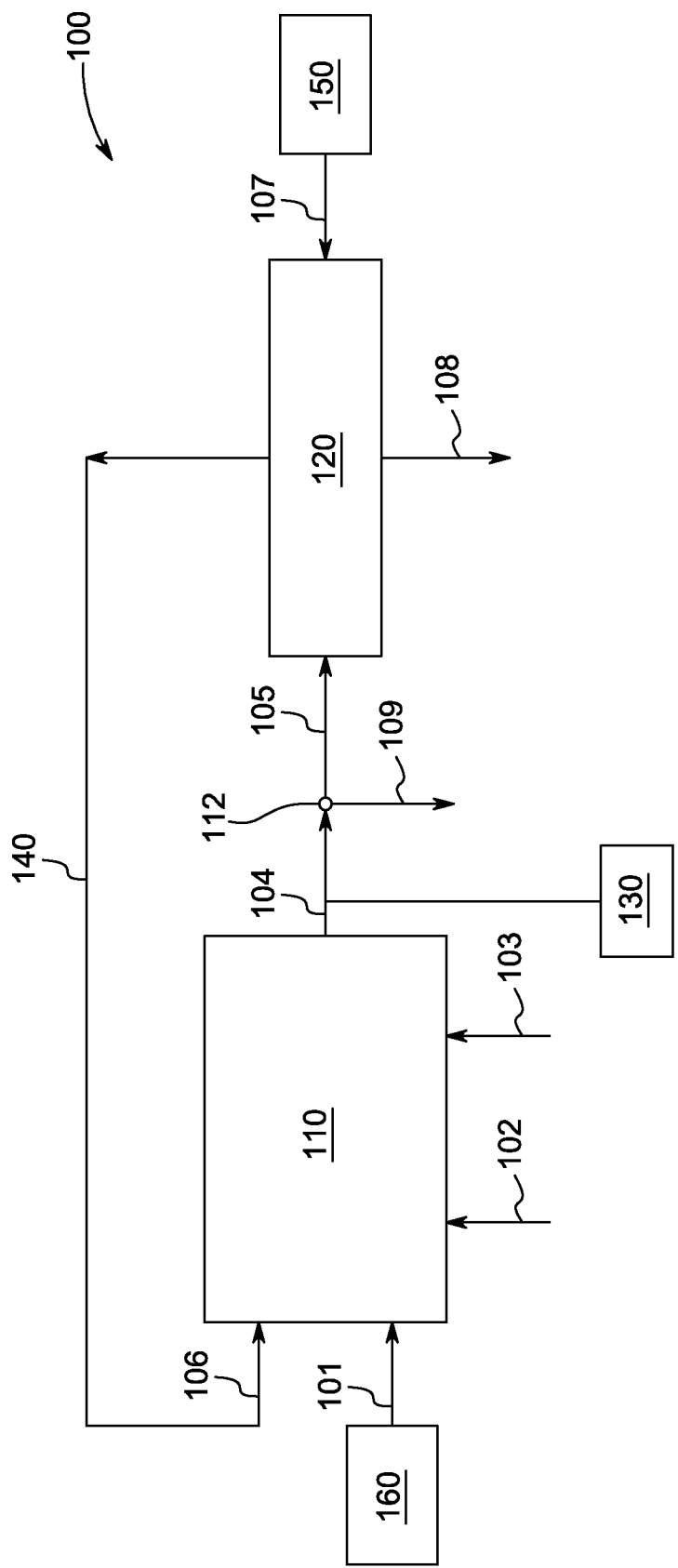
FIG. 1 illustrates a system for steam generation and purification, according to an embodiment of the invention.

FIG. 1 schematically represents a method and system for steam generation and purification as per one embodiment of the present invention. The method includes receiving a fuel stream 101, a water stream 102, and an oxidant stream 103 in a direct contact steam generation (DCSG) apparatus 110.

The term "direct contact steam generation (DCSG) apparatus" refers to an apparatus configured to perform "direct contact steam generation". In "direct contact steam generation", the heat is transferred between the combustion gases and the liquid water through the direct mixing of the two flows. In direct contact steam generation, the combustion pressure may be similar to the produced steam pressure, and the combustion gases are mixed with the steam. The DCSG apparatus can also be referred to as direct contact evaporator or direct contact dryer. This is in contrast to a non-direct steam generator (for example, a steam boiler) or a "once through steam generator" (OTSG), in which the heat is transferred from the combustion side to the steam generation side through a physical separation that allows the heat transfer but prevents the mixture of the combustion side fluid, the water and steam. The pressure of the generated steam is higher than the pressure of the combustion, and the product is pure steam (or a steam and water mixture, as in the case of the OTSG).

The DCSG apparatus 110 may have any suitable configuration for its intended purpose. Non-limiting examples of suitable configurations for the DCSG apparatus 110 include rotating DCSG, up-flow fluid bed combustion DCSG, down-flow combustor DCSG, integrated rotating DCSG, or combinations thereof. Some specific configurations of the DCSG apparatus are described in U.S. Patent Publication No.s 2010/0050517, 2010/0037835, 2011/0036308, and 2011/0232545, Canadian Patent Publication No. 2665751; and U.S. Pat. No. 7,814,867, incorporated herein by reference so long as not directly contradictory to the teachings described herein.

A suitable fuel in the fuel stream 101 may include a hydrocarbon fuel. As used herein, the term "hydrocarbon fuel" refers to any solid fuel, liquid fuel, solid fuel source, or liquid fuel source which is derived from organic materials such as refinery residue materials (for example, tar, heavy oils, petcoke, coke, or coal) or biofuels (for example, wood, peat, corn, corn husks, wheat, rye, or other grains). In certain embodiments, the fuel stream may include natural gas. The term "natural gas" as used herein refers to a hydrocarbon gas or a hydrocarbon gas mixture primarily comprised of methane. In certain embodiments, the natural gas includes a mixture of methane with other hydrocarbons. The natural gas may further include other components, such as for example, carbon dioxide, nitrogen, and hydrogen sulfide. In certain embodiments, the fuel stream 101 may comprise substantially all natural gas. The term "substantially" as used in this context means that an amount of natural gas in the fuel stream 101 is greater than about 95 weight percent. In some embodiments, the amount of natural gas in the fuel stream is greater than about 98 weight percent.

The term "oxidant stream" as used herein may refer to oxygen ($O_2$), natural air, or $O_2$-enriched air. In certain embodiments, the oxidant stream may comprise substantially all $O_2$. The term "substantially" as used in this context means that an amount of $O_2$ in the oxidant stream 103 is greater than about 95 weight percent. In some embodiments, the amount of $O_2$ in the oxidant stream 103 is greater than about 98 weight percent. The term "water stream" as used herein refers to water which may be taken from any readily available source, and may further include dissolved, suspended or entrained solids and hydrocarbons.

The method further includes generating a gas mixture stream 104 in the DCSG apparatus 110, as indicated in FIG. 1. In some embodiments, the DCSG apparatus 110 may include one or more combustors (not shown) configured to receive the fuel stream 101 and the oxidant stream 103. The DCSG apparatus 110 may further include a steam generator (not shown) operatively coupled to the one or more combustors, where the gas mixture 104 may be generated. In some embodiments, the gas mixture stream 104 may primarily include steam and carbon dioxide ($CO_2$). In some embodiments, the gas mixture stream 104 may further include other components in the gas mixture stream 104, such as, for example nitrogen ($N_2$), which may be present in the gas mixture stream if air is used for combustion instead of high-purity $O_2$.

As noted earlier, the methods and systems in accordance with some embodiments of the invention provide for purification of steam such that the impurities such as $CO_2$, $N_2$, and the like are removed for specific end-use applications, for example, enhanced oil recovery (EOR). Accordingly, the method further includes purifying the gas mixture stream 104 using a membrane separator 120.

The method further includes receiving at least a portion 105 of the gas mixture stream 104 in a membrane separator 120. The term "membrane separator" as used herein refers to an apparatus configured to separate steam from $CO_2$ (and any other impurities or gases if present) via a membrane. The terms "membrane separator" and "separator' are used herein interchangeably for the sake of brevity.

Figure 2:
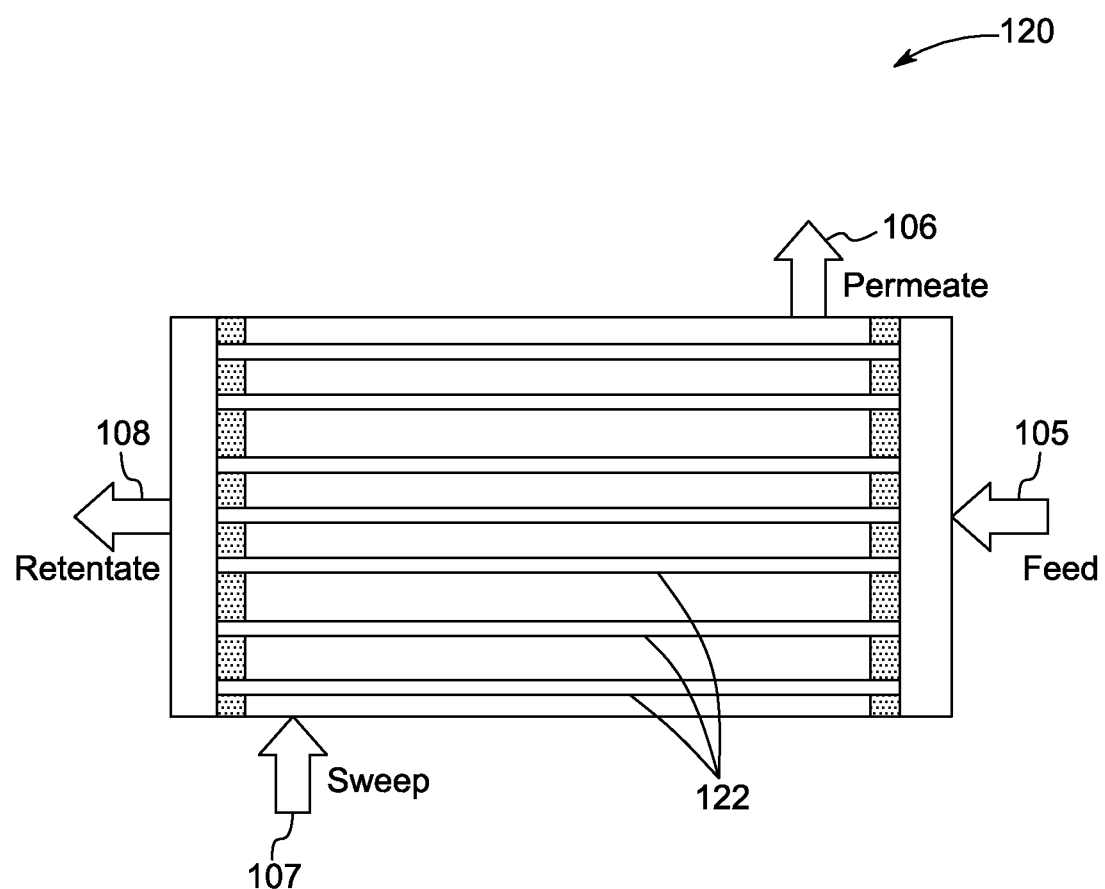
FIG. 2 illustrates a schematic of a membrane separator, according to an embodiment of the invention.

In some embodiments, the method further includes receiving a sweep gas 107 in the membrane separator 120, as shown in FIGS. 1 and 2. The term sweep gas as used herein refers to a gas stream including a gas at high pressure that allows for separation of steam in the membrane separator 120 by transferring at least a portion of steam to the sweep gas stream 107. Without being bound by any theory, it is believed that the use of the sweep gas allows for the pressure of the steam to be maintained on the permeate side. In conventional membrane separations wherein a sweep gas is not used, the pressure on the permeate side would be considerably lower, which may not be desirable. As will be described in detail below, the sweep gas 107 may be received at the membrane separator 120 from a suitable sweep gas source.

In some embodiments, the sweep gas 107 may include or more gases that are combustible in the DCSG apparatus 110. In some embodiments, the sweep gas includes a gas that has substantially the same composition as the fuel gas in the fuel stream. In certain embodiments both the fuel gas and the sweep gas include methane ($CH_4$). Without being bound by any theory, it is believed by using a sweep gas that has substantially the same composition as the fuel gas, and by recirculating the sweep gas along with the permeate to the DCSG apparatus, a fuel gas having a higher impurity content in the fuel stream 101 may be used. In some embodiments, the sweep gas 107 may further include one or more impurities (such as, for example $N_2$) that may be removed (along with $CO_2$) in the membrane separator 120. In some embodiments, the pressure of the sweep gas stream 107 may be in a range from about 10 psi to about 500 psi.

It should be noted that the direction of flow into the membrane separator of the various input streams (such, as for example, 105 and 107) in FIGS. 1 and 2 is for illustration purposes only and may vary depending on the desired separator 120 performance. Thus, by way of example, in some embodiments, the sweep gas stream 107 is caused to flow in a direction that is counter-current to the flow of the gas mixture stream 105, to increase the efficiency for a given volume of the membrane separator. Further, the two streams, that is, the gas mixture stream 105 and the sweep gas stream 107, may be received simultaneously or sequentially in the membrane separator 120.

Referring again to FIG. 2, the separator 120 may further include one or more steam-selective membranes 122 configured to separate at least a portion of $CO_2$ from steam. The term "steam-selective membrane" as used herein refers to a membrane, which allows for the preferential passage of steam while limiting the passage of other components, and which allows for the separation of at least a portion of steam from $CO_2$. In some embodiments of the invention, the steam-selective membrane has a permselectivity of steam over $CO_2$ of at least about 10. In some embodiments of the invention, the steam-selective membrane has a permselectivity of steam over $CO_2$ of at least about 50. The term "permselectivity" of a membrane as used herein refers to the ratio of the permeance of steam to the permeance of $CO_2$. In some embodiments, the steam-selective membrane may have a permeability equal to or greater than about 1000 gas permeation units (GPU), wherein 1 GPU is equal to $1 \times 10^{-6}$ $cm^3$ (STP)/ ($cm^2 \cdot sec \cdot cmHg$).

As noted, the membrane type that may be utilized in the separator is highly selective for steam. Such steam-selective membranes may be comprised of steam-permeable and steam-selective materials, and may be capable of operating in a temperature range of about 100° C. to about 280° C.

Suitable non-limiting examples of steam-selective membranes include certain organic membranes (for example, polymeric membranes); inorganic membranes (for example, metallic, silica, ceramic, carbon, zeolite, oxide or glass membranes); supported-liquid or facilitated transport membranes; hybrid or mixed-matrix membranes comprised of inorganic particles (for example, zeolite, carbon, metal and metal oxides) as the dispersed phase and a polymer matrix as the continuous phase materials, and combinations thereof. In some embodiments, the steam-selective membranes may include a polymer, such as, for example, a homopolymer, a copolymer, a polymer blend, or combinations thereof.

The steam-selective membrane may have any known configuration suitable for application in the present invention. Examples of suitable membrane configurations, may depend, in part, on the membrane material, and may include, flat sheet, spiral wound, tubular, hollow fiber, monolithic (multi-channel), coated tube, composite membrane configurations, or combinations thereof.

Figure 3A:
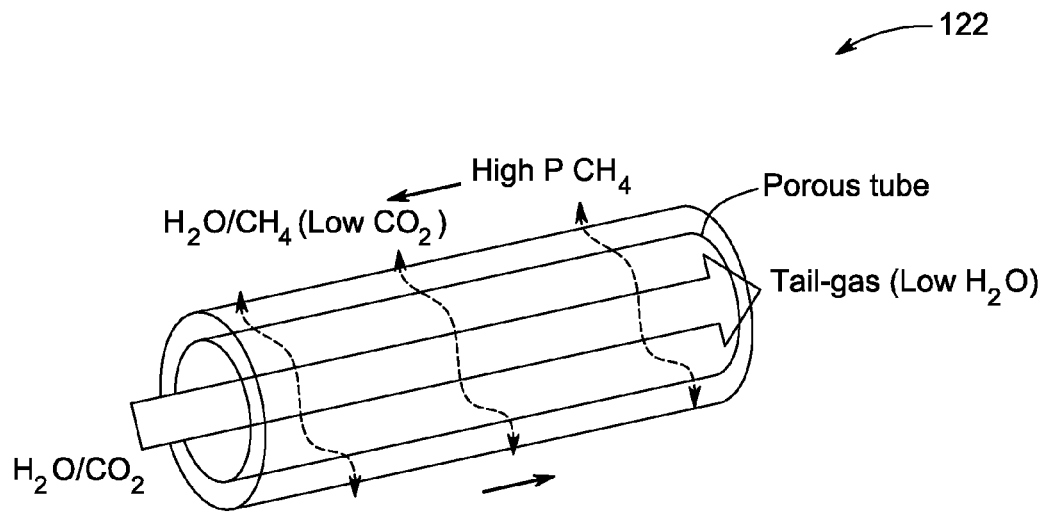
FIG. 3a illustrates a schematic of a membrane, according to an embodiment of the invention.
Figure 3B:
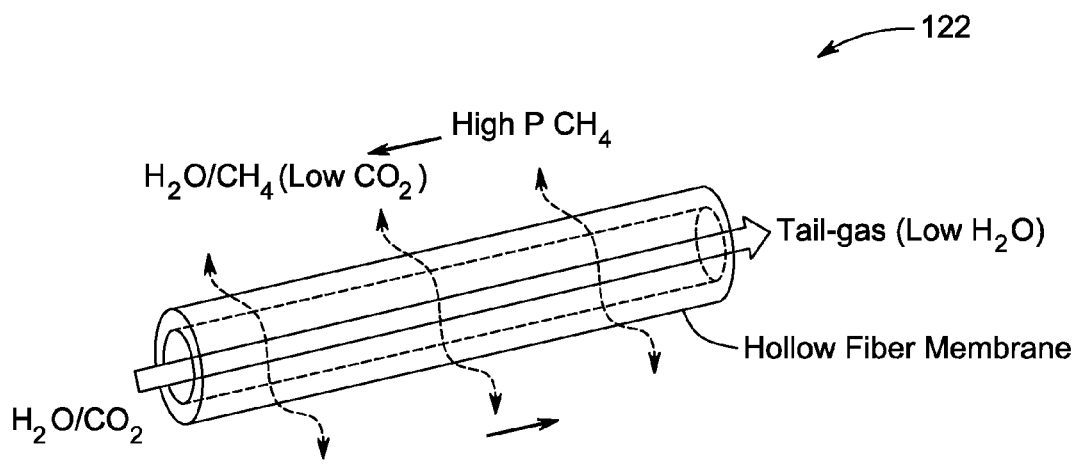
FIG. 3b illustrates a schematic of a membrane, according to an embodiment of the invention.

FIG. 3a illustrates a steam-selective membrane 122 configuration, wherein the membrane separator includes a porous tube with a steam-selective membrane coated on a tube wall. FIG. 3b illustrates another steam-selective membrane 122 configuration including a polymeric hollow fiber. As illustrated in FIGS. 3a and 3b, the permeate stream including steam is removed from the steam/$CO_2$ gaseous mixture, via the steam-selective membrane 122. It should be noted that although FIGS. 3a and 3b illustrate embodiments wherein the gas mixture flow is inside the tube/fiber and the $CH_4$ sweep gas stream flow is outside the tube/fiber, embodiments of the invention described herein also encompass scenarios wherein the direction of flow is reversed, that is, the $CH_4$ sweep gas stream flows inside the tube/fiber and the gas mixture stream flow is outside the tube/fiber. Some specific membrane materials and configurations are described in U.S. Patent Publication No.s 2007/0072949, 2011/0020188, 2011/0099969, and 2011/0030384, incorporated herein by reference so long as not directly contradictory to the teachings described herein.

Further, the membrane may be positioned in a single membrane unit (stage) or in several units, wherein each unit may be comprised of one or more separate membranes. Typically, the number of membrane units may depend on the surface area of the separate membranes in combination with the required quantity of steam to be permeated. The membrane units may include steam separation membranes of the same type, or a different type, in terms of composition or configuration. As a consequence, the membrane units may differ from each other, in terms of one or more of shape, steam permeance, steam permselectivity, or surface area available for permeation. Furthermore, the membranes may be arranged in series or in parallel, for example.

The method further includes separating at least a portion of the steam from the $CO_2$ in the gas mixture stream 105 using the membrane separator 120 to generate a permeate stream 106, as shown in FIGS. 1 and 2. As noted earlier, in embodiments wherein a sweep gas 107 is used in the membrane separator 120, the permeate stream 106 may further include at least a portion of the sweep gas 107.

As indicated in FIGS. 1 and 2, the method further includes forming the $CO_2$ stream 108. The $CO_2$ stream 108 primarily comprises $CO_2$ and may further include additional gases, such as, for example, CO, $N_2$, and water vapor. The method may further include subjecting the $CO_2$ stream 108 to one or more treatment steps such that the $CO_2$ stream is rendered suitable for its intended use. In certain embodiments, the $CO_2$ stream 108 may be further treated in a water-separation stage (not shown), wherein any residual water content in the $CO_2$ stream may be removed. The $CO_2$ stream 108 formed by separating steam from the $CO_2$ in the membrane separator 120 is sometimes referred to as "tail gas" in the art.

The method further includes recirculating at least a portion of the permeate stream 106 to the DCSG apparatus 110, as shown in FIG. 1. In some embodiments, a recirculation percentage of the permeate stream is in a range from about 50 mole percent to about 100 mole percent. In some embodiments, a recirculation percentage of the permeate stream is in a range from about 70 mole percent to about 100 mole percent. In some embodiments, a recirculation percentage of the permeate stream is in a range from about 90 mole percent to about 100 mole percent. In certain embodiments, the recirculation percentage of the permeate stream is about 100 percent. The term "recirculation percentage" as used herein refers to the amount of the permeate stream (in mole percentage) that is recirculated to the DCSG apparatus 110.

Without being bound by any theory, it is believed that recirculation of the permeate stream 106 in the DCSG apparatus 110 advantageously provides for a product stream (including steam) having a pressure that is substantially the same or greater than the gas mixture stream 105. This is in contrast to a conventional steam generation and purification system, wherein the membrane separator operates on the principle of pressure gradient between the feed and the sweep acting as the driving force for the desired separation to take place. However, in such systems a low pressure product stream is typically generated, which may be undesirable. The method and system in accordance with some embodiments of this invention, may instead utilize the concentration difference of the steam between the feed and sweep side to enable the separation, while maintaining the desired steam pressure on the permeate side. In some other embodiments, the pressure of the permeate side may be controlled or adjusted to be lower than the pressure on the feed side (for example, by reducing the pressure of the sweep gas), and the separation may be further aided by the pressure differential across the membrane. In some embodiments, the separation across the membrane may be effected using both the concentration and pressure differential across the membrane.

Further, without being bound by any theory, it is believed that, by recirculating at least a portion of the permeate stream 106 to the DCSG apparatus 110, the $CO_2$ content in the gas mixture stream 104 may be continuously reduced until a desired value is reached. In some embodiments, the method further includes monitoring a $CO_2$ content in the gas mixture stream 104. The $CO_2$ content in the gas mixture stream 104 may be monitored using any suitable sensing or monitoring system 130, as indicated in FIG. 1.

Referring again to FIG. 1, the method further includes discharging at least a portion of the gas mixture stream 104 at an outlet 112 of the DCSG apparatus 110 as a product stream 109, if the $CO_2$ content is lower than a determined value. As shown in FIG. 1, the product stream 109 is discharged and collected after the DCSG apparatus 110 and before the membrane separator 120. This is in contrast to conventional steam generation and purification methods and systems, in which the steam as a product stream is discharged at an outlet of the membrane separator 120 instead of the DCSG apparatus 110.

In conventional steam generation and purification methods and systems, wherein a sweep gas is not used, the pressure on the permeate side would be considerably lower, which may not be desirable. As alluded to previously, in accordance with some embodiments of the invention, the sweep gas allows for the pressure of the steam to be maintained on the permeate side. However, if the permeate stream 106 is collected as a product stream, the $CO_2$ impurity is replaced by the sweep gas (for example, methane) in the permeate stream 106. Thus, collecting the product stream 109 (as shown in FIG. 1) at an outlet of the DCSG apparatus in accordance with embodiments of the invention allows for a high purity (for example, having low $CO_2$ and low $CH_4$ content) steam to be generated having the desired pressure. The method and system in accordance with the embodiments of the invention may provide for generation of high purity steam having the desired pressure by: (1) recycling the steam to the DCSG apparatus; (2) using a high pressure sweep gas; (3) removing the $CO_2$ in the membrane separator; and by (4) using the sweep gas as a fuel gas in the combustor.

The term "determined value" as used herein refers to the maximum amount of $CO_2$ allowed in the product stream 109 depending on the end-use. In some embodiments, the determined value of $CO_2$ in the gas mixture stream 104 is less than about 6 mole percent. In some embodiments, the determined value of $CO_2$ in the gas mixture stream 104 is less than about 5 mole percent. In some embodiments, the determined value of $CO_2$ in the gas mixture stream 104 is less than about 4 mole percent. Accordingly, in some embodiments, the $CO_2$ content in the product stream 109 is less than about 6 mole percent. In some embodiments, the $CO_2$ content in the product stream 109 is less than about 5 mole percent. In some embodiments, the $CO_2$ content in the product stream 109 is less than about 4 mole percent.

As shown in FIG. 1, a portion of the gas mixture stream 104 is discharged at the outlet 112 as a product stream 109, and a portion 105 of the gas mixture stream 104 is received in the membrane separator 120. In some embodiments, a discharge percentage is in a range from about 50 mole percent to about 90 mole percent. In some embodiments, a discharge percentage is in a range from about 60 mole percent to about 90 mole percent. In some embodiments, a discharge percentage is in a range from about 70 mole percent to about 90 mole percent. The term "discharge percentage" as used herein refers to the ratio (in mole percentage) of the portion 109 of the gas mixture stream 104 discharged as a product stream to the portion 105 of the gas mixture stream 104 received at the membrane separator.

As noted earlier, the methods and systems in accordance with embodiments of the invention provide for generation of steam with a desired pressure value for the end-use application. In some embodiments, the product stream 109 includes steam at a pressure greater than 400 psi. In some embodiments, the product stream 109 includes steam at a pressure greater than 450 psi. In some embodiments, the product stream 109 includes steam at a pressure greater than 500 psi.

The method and system in accordance with some embodiments of the invention may further provide for supplying at least a portion of the product stream 109 to a location of the intended use. In some embodiments, the product stream 109 may be further subjected to one or more additional post-processing steps such as compression, purification, and the like before supplying it to the end-use location. In some embodiments, the method further includes supplying at least a portion of the product stream 109 to an enhanced oil recovery (EOR) system (not shown). In certain embodiments, the method further includes supplying at least a portion of the product stream 109 to a steam assisted gravity drainage (SAGD) system (not shown).

In some embodiments, the method for steam generation and purification includes receiving a methane stream 101, a water stream 102, and an oxidant stream 103 in a direct contact steam generation (DCSG) apparatus 110, as indicated in FIG. 1. The method further includes generating a gas mixture stream 104 including steam and carbon dioxide ($CO_2$) in the DCSG apparatus 110.

As indicated in FIG. 1, the method further includes receiving at least a portion 105 of the gas mixture stream 104 and a methane sweep gas 107 in a membrane separator 120. At least a portion of the steam from the gas mixture stream 105 is separated to generate a permeate stream 106, including steam and at least a portion of the methane sweep gas 107. The method further includes recirculating at least a portion of the permeate stream 106 to the DCSG apparatus 110.

With continued reference to FIG. 1, the method further includes monitoring $CO_2$ content in the gas mixture stream 104; and discharging at least a portion 109 of the gas mixture stream 104 at an outlet 112 of the DCSG apparatus 110 as a product stream 109 if the $CO_2$ content is lower than a determined value.

A system 100 for steam generation and purification is also presented. Referring again to FIG. 1, the system 100 includes a direct contact steam generator (DCSG) apparatus 110. The DCSG apparatus is configured to receive a fuel stream 101, a water stream 102, and an oxidant stream 103, as indicated in FIG. 1. The DCSG apparatus 110 is further configured to generate a gas mixture stream 104 including steam and carbon dioxide ($CO_2$).

The system 100 further includes a membrane separator 120 configured to receive at least a portion 105 of the gas mixture stream 104, and separate at least a portion of the steam from the gas mixture stream 105 to generate a permeate stream 106, as indicated in FIG. 1. Referring again to FIG. 1, in some embodiments, the system 100 may further include a sweep gas source 150 configured to supply the sweep gas 107 to the membrane separator 110. As mentioned previously, the membrane separator 120 is configured to generate the permeate stream 106 including at least a portion of the sweep gas 107.

Referring again to FIG. 1, the system 100 further includes a fuel source 160 configured to supply the fuel stream 101 to the DCSG apparatus 110. As alluded to previously, in some embodiments, the sweep gas 107 includes a gas that has substantially the same composition as the fuel gas in the fuel stream 101. In certain embodiments both the fuel gas and the sweep gas substantially comprise methane ($CH_4$). The term substantially as used in this context means that an amount of $CH_4$ in the fuel gas or the sweep gas is greater than 95 weight percent.

The system 100 further includes a recirculation loop 140 configured to supply at least a portion of the permeate stream 106 to the DCSG apparatus 110. With continued reference to FIG. 1, the system 100 further includes a monitoring unit 130 configured to monitor a $CO_2$ content in the gas mixture stream 104. Further, as indicated in FIG. 1, DCSG apparatus 110 further includes a discharge outlet 112 configured to discharge at least a portion 109 of the gas mixture stream 104 as a product stream 109 if the $CO_2$ content is lower than a determined value.

As alluded to previously, in some embodiments, the discharge outlet 112 is configured to supply at least a portion of the product stream 109 to an enhanced oil recovery (EOR) system (not shown). In some embodiments, the discharge outlet 112 is configured to supply at least a portion of the product stream 109 to a steam assisted gravity drainage (SAGD) system (not shown). In some embodiments, the system 100 may further include one or more additional components, such as, for example, a compressor and the like, fluidly connected to the discharge outlet 112.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A method for steam generation and purification, comprising:
   (i) receiving a fuel stream, a water stream, and an oxidant stream in a direct contact steam generation (DCSG) apparatus;
   (ii) generating a gas mixture stream comprising steam and carbon dioxide ($CO_2$) in the DCSG apparatus;
   (iii) receiving at least a portion of the gas mixture stream in a membrane separator, and separating at least a portion of the steam from the gas mixture stream to generate a permeate stream;
   (iv) recirculating at least a portion of the permeate stream to the DCSG apparatus;
   (v) monitoring a $CO_2$ content in the gas mixture stream; and
   (vi) discharging at least a portion of the gas mixture stream at an outlet of the DCSG apparatus as a product stream if the $CO_2$ content is lower than a determined value.

2. The method of claim 1, further comprising receiving a sweep gas in the membrane separator, and wherein the permeate stream further comprises at least a portion of the sweep gas.

3. The method of claim 2, wherein a fuel gas in the fuel stream has substantially the same composition as the sweep gas.

4. The method of claim 3, wherein both the fuel gas and the sweep gas comprise methane.

5. The method of claim 1, wherein a recirculation percentage in step (iv) is in a range from about 50 mole percent to about 100 mole percent.

6. The method of claim 1, wherein a discharge percentage in step (vi) is in a range from about 50 mole percent to about 90 mole percent.

7. The method of claim 1, wherein the determined value is less than 6 mole percent.

8. The method of claim 1, wherein the product stream comprises steam at a pressure greater than about 400 psi.

9. The method of claim 1, wherein the membrane separator comprises a hollow fiber membrane, a coated tube membrane, a flat sheet membrane, a spiral wound membrane, a composite membrane, or combinations thereof.

10. The method of claim 1, wherein the membrane separator comprises a polymer membrane, a ceramic membrane, a mixed matrix membrane, a metallic membrane, a silica membrane, a carbon membrane, a liquid/facilitated transport membrane, a zeolite membrane, or combinations thereof.

11. The method of claim 1, further comprising supplying at least a portion of the product stream to a steam assisted gravity drainage (SAGD) system.

12. A method for steam generation and purification, comprising:
   (i) receiving a methane stream, a water stream, and an oxidant stream in a direct contact steam generation (DCSG) apparatus;
   (ii) generating a gas mixture stream comprising steam and carbon dioxide ($CO_2$) in the DCSG apparatus;
   (iii) receiving at least a portion of the gas mixture stream and a methane sweep gas in a membrane separator, and separating at least a portion of the steam from the gas mixture stream to generate a permeate stream comprising steam and at least a portion of the methane sweep gas;
   (iv) recirculating at least a portion of the permeate stream to the DCSG apparatus;
   (v) monitoring a $CO_2$ content in the gas mixture stream; and
   (vi) discharging at least a portion of the gas mixture stream at an outlet of the DCSG apparatus as a product stream if the $CO_2$ content is lower than a determined value, wherein a discharge percentage in step (vi) is in a range from about 50 mole percent to about 90 mole percent.

13. A system for steam generation and purification, comprising:
   (i) a direct contact steam generator (DCSG) apparatus configured to receive a fuel stream, a water stream, and an oxidant stream, and further configured to generate a gas mixture stream comprising steam and carbon dioxide ($CO_2$);
   (ii) a membrane separator configured to receive at least a portion of the gas mixture stream, and separate at least a portion of the steam from the gas mixture stream to generate a permeate stream;
   (iii) a recirculation loop configured to supply at least a portion of the permeate stream to the DCSG apparatus;
   (iv) a monitoring unit configured to monitor a $CO_2$ content in the gas mixture stream; and
   (v) a discharge outlet in the DCSG apparatus configured to discharge at least a portion of the gas mixture stream as a product stream if the $CO_2$ content is lower than a determined value.

14. The system of claim 13, further comprising a sweep gas source configured to supply a sweep gas to the membrane separator, and wherein the membrane separator is configured to generate the permeate stream comprising at least a portion of the sweep gas.

15. The system of claim 14, further comprising a fuel source configured to supply the fuel stream to the DCSG apparatus, wherein a fuel gas in the fuel stream has substantially the same composition as the sweep gas.

16. The system of claim 15, wherein both the fuel gas and the sweep gas comprise methane.

17. The system of claim 13, wherein the determined value is less than 6 mole percent.

18. The system of claim 13, wherein the membrane separator comprises a hollow fiber membrane, a coated tube membrane, a flat sheet membrane, a spiral wound membrane, a composite membrane, or combinations thereof.

19. The system of claim 13, wherein the membrane separator comprises a polymer membrane, a ceramic membrane, a mixed matrix membrane, a metallic membrane, a silica membrane, a carbon membrane, a liquid/facilitated transport membrane, a zeolite membrane, or combinations thereof.

20. The system of claim 13, wherein the discharge outlet is configured to discharge at least a portion of the product stream to a steam assisted gravity drainage (SAGD) system.

* * * * *